Aug. 23, 1966 R. H. SHADRICK 3,268,670

AUTOMATIC SIGNALING APPARATUS

Filed Aug. 12, 1963 6 Sheets-Sheet 1

INVENTOR.
RICHARD H. SHADRICK
BY
Carlson, Carlson & Sturm
ATTORNEYS

AUTOMATIC SIGNALING APPARATUS

Filed Aug. 12, 1963 6 Sheets-Sheet 2

INVENTOR.
RICHARD H. SHADRICK
BY
Carlson, Carlson & Sturm
ATTORNEYS

Aug. 23, 1966 R. H. SHADRICK 3,268,670

AUTOMATIC SIGNALING APPARATUS

Filed Aug. 12, 1963 6 Sheets-Sheet 3

INVENTOR.
RICHARD H. SHADRICK
BY
Carlsen, Carlsen & Sturm
ATTORNEYS

INVENTOR.
RICHARD H. SHADRICK
BY
Carlson, Carlson & Sturm
ATTORNEYS

INVENTOR.
RICHARD H. SHADRICK
BY
Carlsen, Carlsen & Sturm
ATTORNEYS

Aug. 23, 1966 R. H. SHADRICK 3,268,670

AUTOMATIC SIGNALING APPARATUS

Filed Aug. 12, 1963 6 Sheets-Sheet 6

INVENTOR.
RICHARD H. SHADRICK
BY
Carlsen, Carlsen & Sturm
ATTORNEYS 3,268,670
AUTOMATIC SIGNALING APPARATUS
Richard H. Shadrick, Minneapolis, Minn., assignor to Richard H. Shadrick, Jr., Glen Burnie, Md.
Filed Aug. 12, 1963, Ser. No. 301,446
14 Claims. (Cl. 179—90)

This invention relates generally to code signaling apparatus and is more particularly directed to apparatus for dialing a standard dial telephone in response to a source of signal.

As one example of an application in which my invention may be utilized, a fire alarm system which is capable of providing a suitable signal from unattended locations such as rural or remote areas where telephone service is in existence may easily be provided without electrical connections to the telephone system through the use of my invention, to be described below, for dialing a predetermined telephone number and which may be adapted to coact with suitable apparatus for transmitting a coded signal or a recorded message after the telephone number has been dialed and a connection made. It should further be noted that the general type of apparatus with which my invention is concerned is designed to overcome the objection normally encountered in the use of equipment owned by public utilities for code signaling as a part of the normal residential or business service. The use of leased or private communications systems specifically for the normally infrequent signaling required by emergency alarm systems becomes prohibitive in all but the largest installations which are designed to provide security for large and expensive facilities, for example public buildings and the like. Because my invention is designed for use with the typical dial telephone as utilized in a public utility or private utility communication system, it is desirable, under most circumstances, to use the same instrument for the emergency alarm system and as might be utilized in day to day communication. My invention may be utilized in this manner without impairing or disturbing its usefulness in an emergency for dialing a predetermined telephone number at the time an emergency arises when the premises serviced by the dial telephone are unattended. My invention also provides improved apparatus which may be easily adjusted to any predetermined dial code in existence and may easily be extended or modified to accommodate any future contemplated telephone dialing codes. At the same time, my apparatus is designed to provide reliable operation even after long periods of non-use as might be normally encountered in an emergency signaling system.

It is therefore an object of my invention to provide improved signaling apparatus.

Another object of my invention is to provide improved signaling apparatus for dialing a telephone code signal which may be easily adjusted to provide different codes.

Another object of my invention is to provide telephone dialing apparatus which is economical to produce and easy to fabricate.

Another object of my invention is to provide improved telephone dialing apparatus which is easily attached to a telephone without electrical connection thereto.

Another object of my invention is to provide improved telephone dialing apparatus which allows the telephone to which it is attached to be used in a normal fashion.

Another object of my invention is to provide improved telephone dialing apparatus which is easily adaptable to different shapes of dial telephones.

These and other more detailed and specific objects will be disclosed in the course of the following specification, reference being had to the accompanying drawings, in which—

Figures 1, 2:
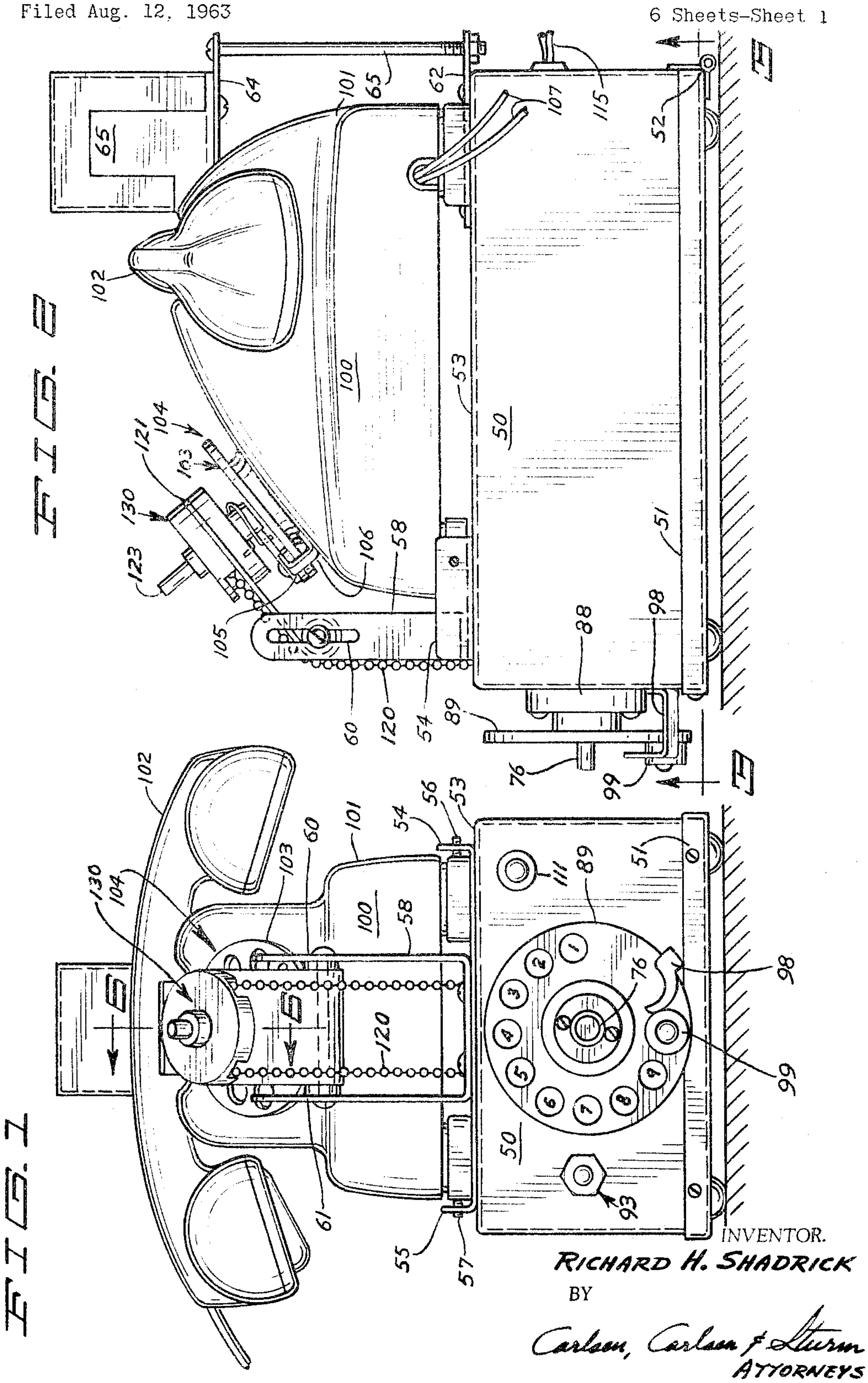
FIG. 1 is a front elevational view of apparatus embodying the principles of my invention.
FIG. 2 is a side elevational view of the apparatus shown in FIG. 1.

In the drawings, like reference numerals have been applied to like elements and referring specifically to FIGS. 1 and 2 of the drawing my invention comprises generally a cabinet 50 which is adapted to receive and engage a standard dial telephone, shown as a French-type telephone 100. Cabinet 50 contains suitable means (to be described below) to drive a dialing mechanism which is mounted in cooperating, but not in direct physical contact with a dialing mechanism on telephone 100. A means for lifting the handset on the illustrated French-type telephone is also mounted in cooperating relationship with the handset and, as explained in detail below in connection with the remainder of the drawings, the apparatus contained within cabinet 50 will, upon the receipt of a signal, lift handset 102 on telephone 100 a sufficient distance to place the telephone on the line and proceed to automatically dial a predetermined telephone number and may, under certain circumstances, deliver a coded signal or a recorded message upon completion of the dialing of the number.

Telephone 100 is a representation of what has become the standard telephone and includes a base 101, a handset 102, a dial 103 which is part of a transmitter, indicated generally by the reference numeral 104, an axially upwardly extending plug member 105, which may be comprised of dielectric insulating material, a dial stop 106 which is positioned in predetermined relationship with an opening in dial member 103 corresponding, in typical use, to numeral 0. Base 101 is provided with an aperture through which extends a plurality of conductors 107 adapted for connection to standard telephone lines to connect telephone 100 to a central or branch exchange for communication with the rest of the telephones connected and interconnectible with telephone 100 in a public or private telephone system.

Cabinet 50 includes a bottom member 51 which is hingedly attached at the rear portion of cabinet 50 by suitable hinge means 52. Cabinet 50 also includes a top indicated by reference numeral 53 for supporting telephone 100. At the front end and extending upwardly from top 53 on cabinet 50 are a pair of bracket members 54 and 55 each having horizontally extending screw threaded members 56 and 57 which are adapted to adjustably engage the base 101 of telephone 100 to retain the same in a fixed position on top 53 of cabinet 50. Also at the front top center of cabinet 50 a U-shaped bracket member 58 extends upwardly and is provided with a pair of slots 60 and 61 near the top extremities of the upwardly extending portions. At the rear end of cabinet 50 a horizontally disposed rearwardly extending bracket member 62 is adapted to support an upwardly extending rod 63 which in turn supports a forwardly extending horizontally disposed bracket member 64. A solenoid 65, contained within a suitable housing therefor, has a forwardly extending handset lifting member 66 which extends forwardly and under handset member 102 and is adapted to allow handset member 102 to rest in its normal position in recesses provided therefor in base 101 of telephone 100 and to engage and lift handset member 102 upwardly when suitably energized as will be explained below.

At the forward end of cabinet member 50 there is shown a further dial 89 corresponding to dial 103 on telephone 100 and which includes a forwardly extending plug member 99 which is adapted to coact with a stop member 98 suitably mounted in a fixed position on the front of cabinet 50. Dial member 89, as will be explained in detail below, is rotatably journaled upon a shaft member 76.

In FIG. 1 a switch means 111 is disposed in the upper right-hand corner of the front part of cabinet 50 and a bearing member 93, for slidably journaling shaft 91, is shown in position at the center left-hand part of the front face of cabinet 50. A dial drive mechanism 130 is adjustably mounted for positioning coaxially above dialing mechanism 104 on telephone 100. A suitable drive member for maintaining positive indexing between dial member 89 and dial member 104 is shown in the form of a beaded chain 120 extending between dial drive mechanism 130 and the inside of cabinet 50. Reference to the above description and drawings will illustrate to one skilled in the art the ease of adaptability of my apparatus to a standard dial telephone and its relative compactness which contributes to its versatility in a wide range of applications.

Figure 3:
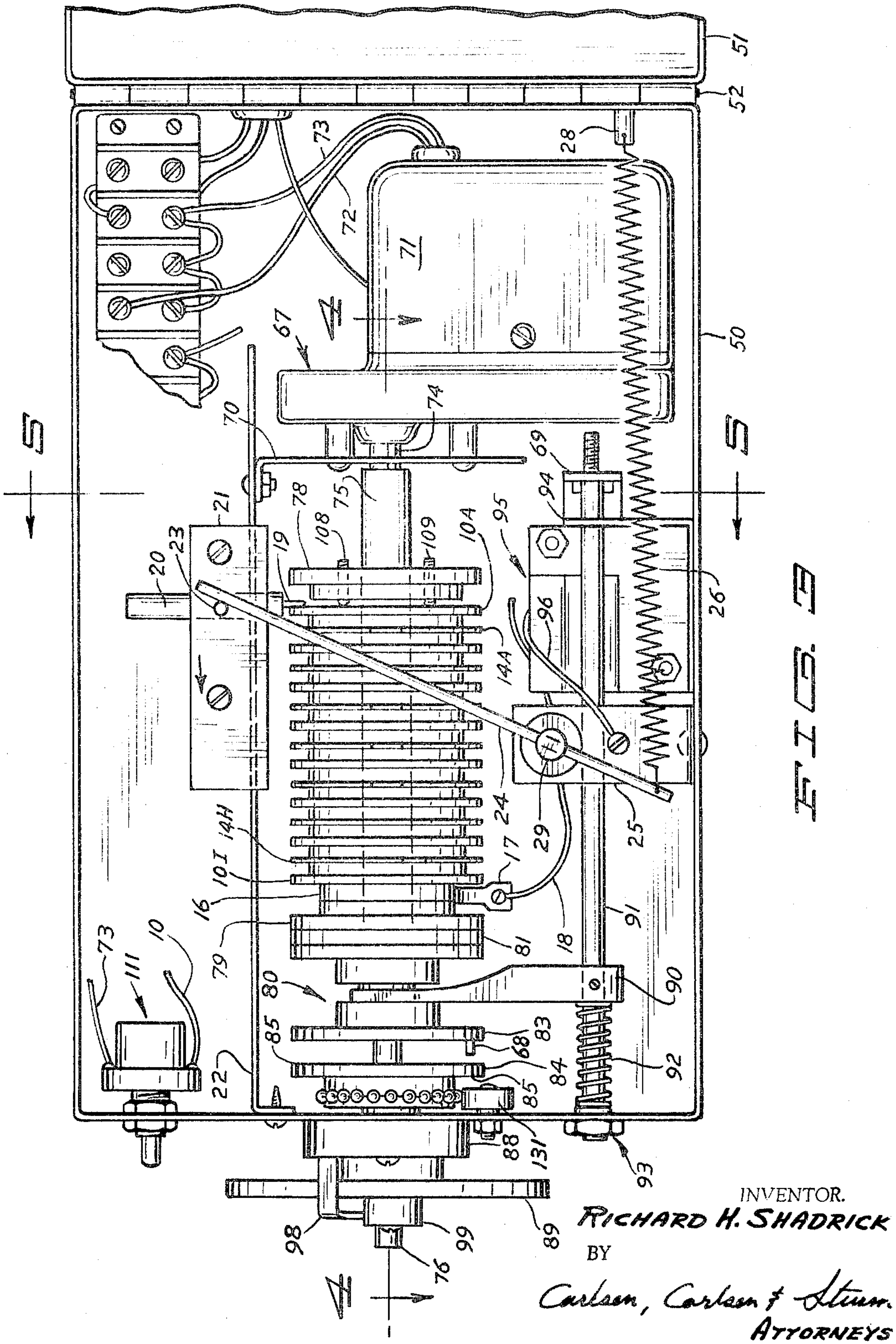
FIG. 3 is a bottom view of the preferred embodiment of my invention with a cover member removed to show the various portions of the apparatus.

Referring now to FIGS. 3, 4, 5, 6, 7, 8 and 9 of the drawing, the details of the dialing mechanism contained within cabinet 50 will be described in conjunction with the illustrated preferred embodiment of my invention. In FIG. 3, a motor means 71 which is adapted to drive an output shaft 74 through a gear box 67 is shown attached to a bracket means 70 which is suitably mounted on the inside of cabinet 50. Motor means 71 has a pair of conductors 72 and 73 for connection to a suitable source of alternating current as will be explained below in connection with the electrical schematic drawing of an embodiment of my invention. Shaft 74 is non-rotatably attached, as by a drive pin, to a coupling member 75 and a further shaft 76 extending longitudinally through the front end of cabinet 50 is also non-rotatably attached to coupling member 75 through suitable fastening means shown in the form of a screw threaded set screw. The left-hand end of the shaft 76 is rotatably journaled in the output member of clutching means 80.

Figures 4, 5, 6, 7, 8, 9:
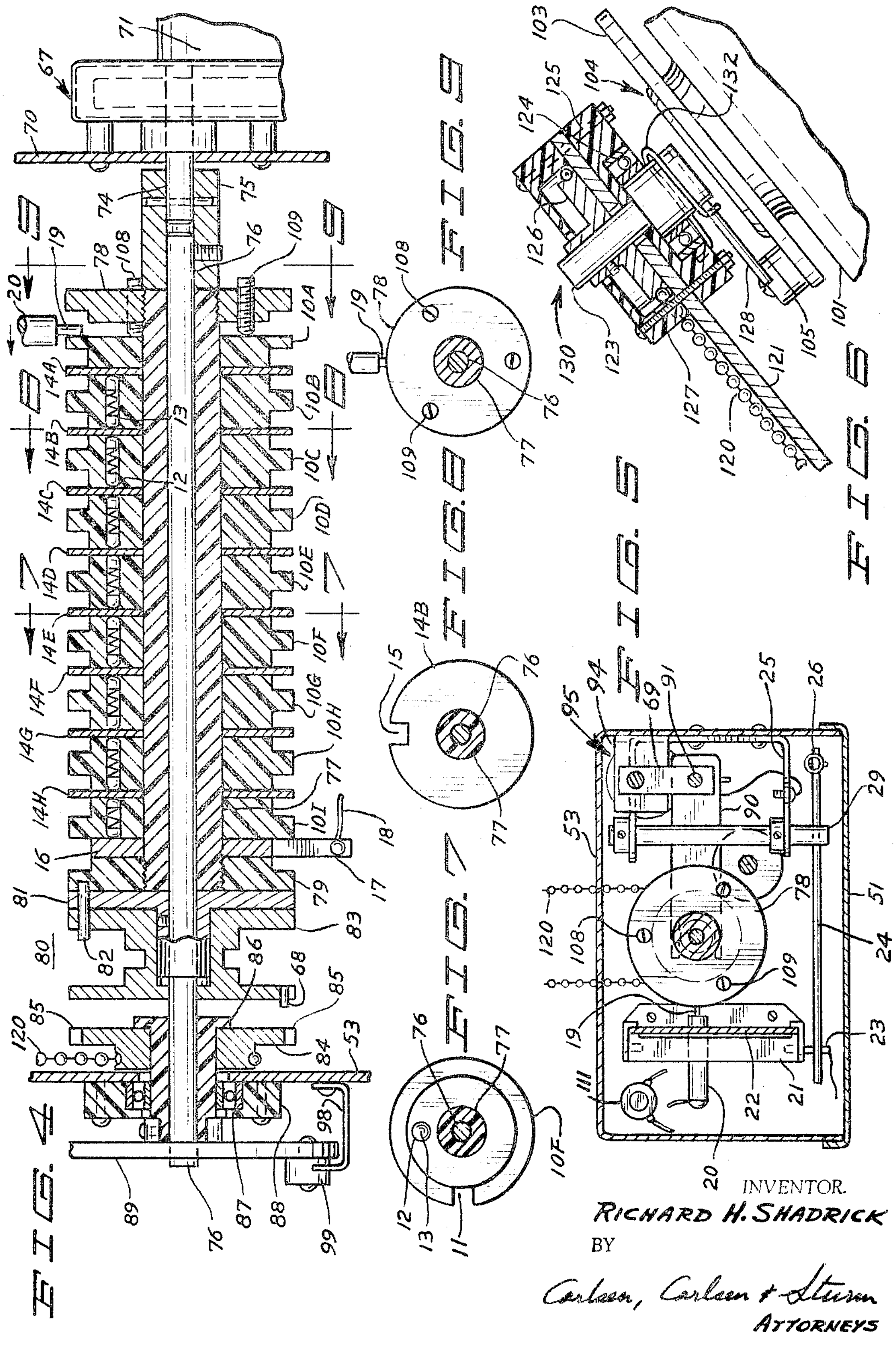
FIG. 4 is a sectional view taken along section lines 4—4 in FIG. 3.
FIG. 5 is a sectional view taken along section lines 5—5 in FIG. 3.
FIG. 6 is a sectional view taken along section lines 6—6 in FIG. 1.
FIG. 7 is a sectional view taken along section lines 7—7 in FIG. 4.
FIG. 8 is a sectional view taken along section lines 8—8 in FIG. 4.
FIG. 9 is a sectional view taken along section lines 9—9 in FIG. 4.

Referring to the sectional view of the shaft assembly in FIG. 4, it may be seen that a dielectric bushing member 77 extends for a considerable distance longitudinally of shaft 76 and has threadably attached, at its left end, a dielectric disk 79 and a threadably attached disk member 78 including axially extending set screws 108 and 109 at its right end. Intermediate disks 78 and 79 may be seen a plurality of alternately disposed dielectric timing disks 10A–10I and conductive dialing disks 14A–14H and a conductive commutator disk 16. Disks 10 and 14 are adjustably rotatably disposed on dielectric sleeve member 77 for purposes to be explained below. The last noted plurality of disks when assembled in the manner illustrated constitute a timing switch drum which may be adjusted to provide any combination of numbers as might be required by a particular installation and, while a seven-digit telephone number is contemplated in the illustrated embodiment, telephone codes having greater or less numbers of digits may easily be accommodated by providing the proper number of disks in the drum assembly. Set screws 108 and 109 in disk 78 serve to provide a means for adjusting the angular relationship between the various disks on dielectric sleeve 77 to initially calibrate or set the apparatus for dialing a predetermined number. Commutator disk 16 is interconnected with each of the plurality of conductive dialing disks 14A–H through a plurality of spring loaded pin members 13 which extend axially through apertures 12 in each of the dielectric timing disks 10B–10I in the manner shown in the drawing so that a complete electrical circuit may exist from commutator disk 16 to any of the conductive dialing disks 14A–14H for purposes to be explained below.

A clutch input member 81 is non-rotatably mounted on shaft 76 adjacent dielectric end disk member 79 and includes a drive pin member 82 extending axially therethrough into dielectric end disk 79 and into transfer member 83 which is slidably journaled on an axially extending hub portion of clutch input member 81 and is non-rotatably mounted thereon through engagement with pin member 82. The left end of coupling member 83 includes an axially extending pin member 68 which is adapted to coact with grooves 85 provided in the outer periphery of clutch output member 84. Clutch output member 84 is non-rotatably disposed on an axially extending dielectric bushing member 86 which extends through the front of cabinet 50 and is rotatably journaled in a bearing means 87 which is held in a retaining member 84 that is suitably fastened to the front end of cabinet 50. Shaft 76 extends through bushing 86 and is rotatably journaled therein. A dial member 89 is suitably attached to the left end of the bushing member 86 and rotates therewith. Clutch output member 84 includes a drum portion adapted to provide positive engagement with bead drive chain member 120. A roller 131 is suitably rotatably journaled to maintain chain 120 in engagement with recesses provided therefor in the drum portion of member 84.

It may thus be seen that dielectric sleeve member 77 and all of the disks mounted thereon rotates in accordance with the rotation of shaft 76 and clutch input and coupling members 81 and 82 and that clutch output member 84 including dial member 89 and bead chain drive member 120 may be operative in accordance with engagement by clutch coupling member 83 or independently of shaft 76 when not in driven engagement with clutch input member 81 so as to allow manual operation thereof.

An electrical contact assembly comprising wiper 17 and conductor 18 is disposed in cooperating electrically conductive relationship with commutator member 16 on dielectric sleeve 77.

Various details of the several portions of FIG. 4 are shown in the sectional views of FIGS. 7, 8, and 9 respectively. In FIG. 7, the dielectric timing disk 10F is shown as having an axially disposed aperture 13 which is adapted to receive a spring biasing contact means 12 and further contains a groove or notch 11 in one location on its outer periphery. Dielectric timing disk member 10F is rotatably journaled on dielectric sleeve 77 which in turn is disposed on shaft 76.

In FIG. 8, conductive dialing disk 14B is provided with a notch 15 at its outer periphery of like suitable dimensions as notch 11 in member 10F. Each of the dielectric timing disks and conductive dialing disks is of like configuration with the exception of dielectric timing disks 10A and 10I, as may be apparent from the drawing, in that dielectric timing disk 10I does not include a notch in its outer periphery and dielectric timing disk 10A does not have an axially extending aperture 13.

In FIG. 9, end disk member 78, having a plurality of set screws including 108 and 109, and conductive pin member 19 are shown in their respective positions with respect to dielectric sleeve 77 and shaft 76. Dielectric timing disk members 10A–10I and conductive dialing disks 14A–14H may be rotated on dielectric sleeve 77 by loosening screw threaded members 108 and 109 on end disk 78 and a predetermined angular relationship between the notches or grooves in the peripheries of the respective disks may be established and upon tightening of the set screws in end disk member 78 a substantially non-rotatable frictional engagement therebetween is established to maintain the desired relationship corresponding to a predetermined telephone number.

A further bracket member 22, suitably adapted to slidably receive a conductive pin carriage assembly 21 is parallelly and radially disposed with respect to shaft 76 and suitably mounted on the inside of cabinet 50. Carriage 21 includes a dielectric member 20 extending transversely thereto for adjustably receiving conductive pin member 19 which is positioned to extend into engagement with the outer peripheries of the respective dielectric and conductive disks. An upwardly extending conductive pin terminal member 23 is conductively connected to conductive pin 19. Carriage 21 is normally positioned at the right end of bracket 22 and is spring biased toward the left-hand end of bracket 22 through a conductive lever member 24 which is adapted to rotate about a pin member 27 which is suitably journaled in a further bracket member 25. The opposite extremity of lever member 24 is connected to a spring biasing means 26, shown in the form of a helical tension spring, that is attached to suitable mounting means 28 positioned on the rear end of cabinet 50. It may thus be seen that lever member 24 will exert a substantially constant biasing force on upwardly extending terminal pin 23 on carriage 21 in the direction indicated by the arrow and that in the relationship shown in the drawing, conductive pin member 19 serves to prevent movement by virtue of its engagement with the right side of dielectric timing disk member 10A.

A clutch solenoid operator 95 having an output member 69 is suitably mounted on the inside of cabinet 50 in proximity to bracket member 25 on a further bracket member 94. The longitudinal and operative axis of solenoid 95 is parallel to the axis of shaft 76. Solenoid 95 is adapted to engage the left end of a clutch operator shaft 91 which extends forwardly through the front of cabinet 50 and is slidably journaled in a bearing member 93. A clutch yoke operating member 90 is suitably attached to shaft 91 and extends into a groove on clutch coupling member 83 for operating the same between positions of engagement and non-engagement with clutch output member 84. Clutch operating rod 91 is spring biased to a rearward position shown in the drawing through suitable helical compression spring means 92. An end view showing the relative positions of the various portions of the above described apparatus may be seen in the sectional view of FIG. 5.

A telephone dialing assembly 130 is shown in operative position in FIGS. 1 and 2 of the drawing and in section in FIG. 6 of the drawing and includes a mounting bracket 121 which is adapted to be rotatably and slidably mounted between slots 60 and 61 in the upwardly extending portions of U-shaped bracket 58. A shaft member 123, including a drum for engagement with bead chain 120, may thus be suitably positioned coaxially of the axis of dial member 103 on telephone 100 for suitable engagement with an upwardly extending plug member 105 that is adapted to be engaged by a radially extending pin member 128 on the lower end of shaft 123. Shaft 123 is suitably journaled in a bearing member 124 mounted in retainer 125. A cover member 127 is positioned around and over drum member 126 connected to shaft 123. It may thus be seen that rotation of shaft 123 in a clockwise direction will provide engagement of axially extending plug member 105, positioned in the hole in dial member 103 corresponding to the numeral 0 to thereby actuate the dialing mechanism on phone 100. By suitably rotating the lower end of bracket member 121, forward or rearward positioning of telephone 100 on top 53 of cabinet 50 and vertical adjustment of member 121 in bracket 58, substantially all types of telephones now in current use may be accommodated. A torsion spring 132 is shown wrapped around the bottom of shaft 130 and in engagement with pin member 128 and retainer 125. Spring 132 is provided to rapidly return pin member to its normal position to allow dial 103 to return to rest at its normal speed.

It may now be apparent that shaft 76 may rotate independently of clutch output member 85 and that connection of shaft 76 to clutch output member 85 by movement of the movable coupling means on clutch 80 into operative engagement therewith may cause a predetermined angular displacement of pin 128 on dial drive assembly 130 and that this may also be done independently through actuation of dial member 89 which is configured and adapted to correspond with a standard telephone dial such as dial 103.

It might further be noted at this point that the characteristics of the standard telephone transmitter assembly 104 contemplated for use with the illustrated embodiment of my invention operates in such a manner whereby radial displacement to a predetermined position will result in a predetermined number of pulses transmitted to a central or branch exchange upon a return of the dial to its initial or starting position and that this operation is well known to those skilled in the art. Reference is made to the information available regarding the operation of this type of apparatus from any telephone utility company.

Figure 10:
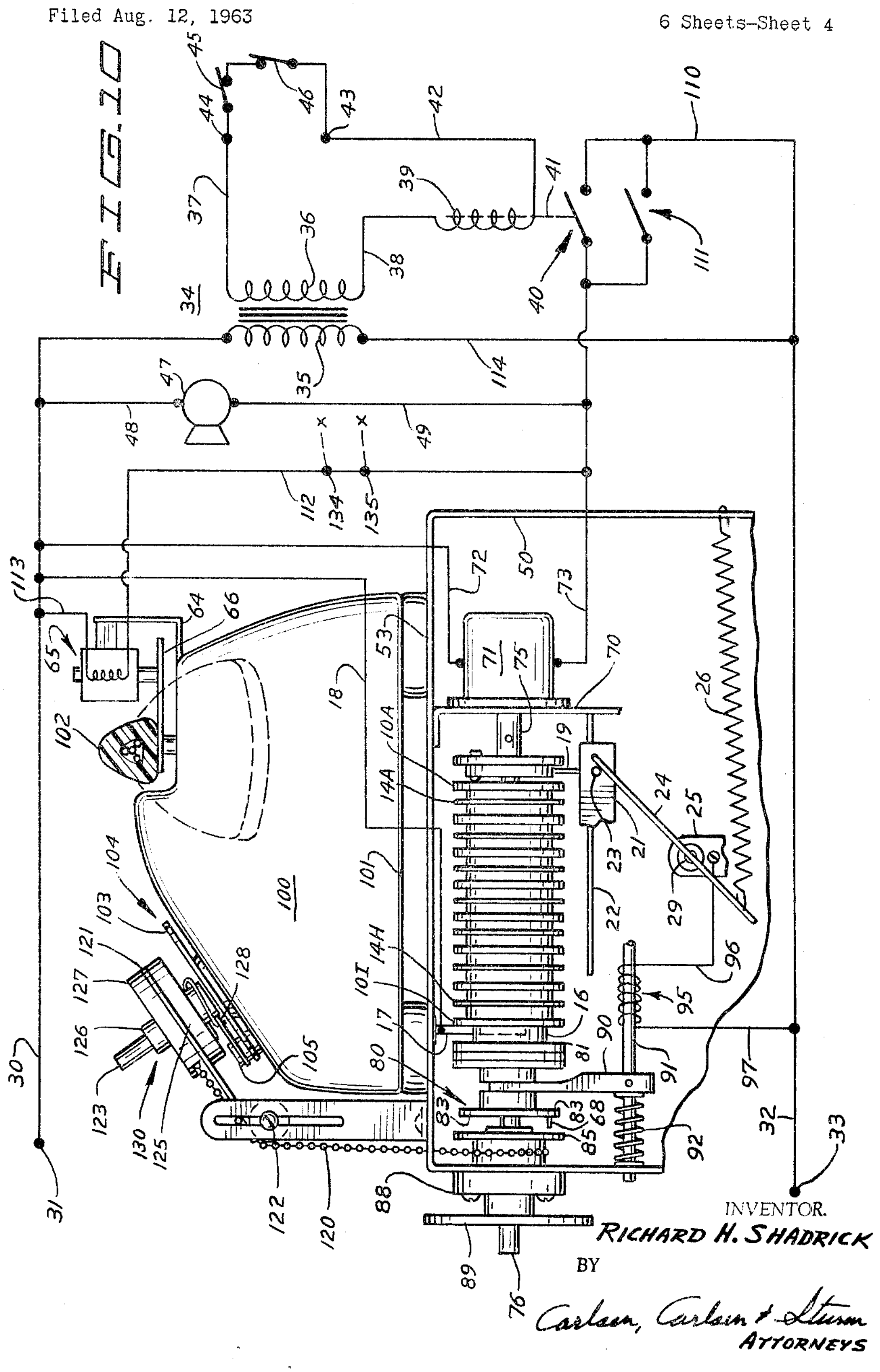
FIG. 10 is an electrical schematic and diagrammatic sketch of the preferred embodiment of my invention.

Referring now to FIG. 10 of the drawings, there is shown a schematic diagram and diagrammatic sketch of various portions of my invention from which certain elements have been displaced from the relationship indicated in the remainder of the drawings also for the sake of clarity in explaining the operation of my apparatus which will be described below in connection with FIGS. 11 and 12.

In FIG. 10 telephone 100 is shown in position on the top 53 of cabinet 50. It will be assumed that telephone 100 is in its normal inoperative position, that is with the handset 102 in engagement with the switch members normally found in the telephone to disconnect it from the central or branch exchange. The equipment on the inside of cabinet 50 is shown in an operative position that is obtained when the apparatus is ready to dial a telephone number, such as the fire department, in response to a condition responsive means for providing an electrical signal indicative of a fire or other undesirable conditions. A pair of terminals 31 and 33, adapted for connection to a suitable source of alternating current energy are shown connected to a pair of conductors 30 and 32. Conductor 32 is connected to primary winding 35 on transformer 34 through a conductor 114 and conductor 30 is connected to the other end of primary winding 35 to thereby energize transformer 34. A secondary winding 36 on transformer 34 is connected to a supervisory current responsive relay winding 39 through conductor 38. The other end of transformer secondary winding 36 is connected to a terminal 44 through a conductor 32 and the other end of relay winding 39 is connected to a further terminal 43 through conductor 42. Terminals 44 and 43 are adapted to be connected to a plurality of condition responsive devices 45 and 46, of the type which are normally closed, to complete an electrical circuit therebetween and which provide an electrical discontinuity upon sensing a predetermined condition to interrupt the current flow through relay winding 39. A pair of normally closed contacts 40 are operatively connected to relay winding 39 through driving means 41 and, since relay winding 39 is normally energized in the absence of an undesirable condition, contact assembly 40 will be held in an open position as long as the condition to which the condition sensing means 46 is responsive gains in a normal state. A test switch means 111, comprised of a normally open single-pole single-throw switch is connected in parallel with contact assembly 40. A conductor 110 is connected intermediate conductor 32 and the stationary contacts on assembly 40 and switch means 111. The movable contacts on contact assembly 40 and switch means 111 are connected to motor means 71 through conductor 73, to solenoid 65 through conductor 112, and to an audible alarm device 47 through conductor 49. Conductor 30 is also connected to motor means 71 through conductor 72, to solenoid 65 through conductor 43, and to audible alarm means 47 through conductor 48. Audible alarm means 47 may be of the type which provides a continuous signal for merely indicating the presence of an undesirable condition through the telephone after a connection to a predetermined number has been established or may contain more elaborate apparatus for generating a coded signal indicative of the location or nature of the condition that is being transmitted through the telephone. It is also contemplated that other forms of signaling apparatus may be utilized, for example, a tape recorder having an appropriate message prerecorded thereon and the like.

Conductor 30 is also connected to a wiper 17 which is adapted to coact with communtator 16 through conductor 18 and conductive pin 19 is connected to conductor 33 through conductive pin 19, conductive terminal pin 23, lever member 24, a terminal connected thereto on bracket 25, conductor 96, solenoid 95 and conductor 97. It may thus be seen that the apparatus as shown in FIG. 10 in its "ready" position may be utilized merely as a telephone for normal communication through the use of dial member 89 which is connected to dial driving assembly 130 and which will be satisfactory for all normal use.

When a condition is sensed that causes condition sensing means 46 to open the electrical circuit including relay winding 39, relay contact assembly 40 will assume its normally closed position to energize motor 71, solenoid 65, and audible alarm means 47. At this time motor 71 will rotate shaft 76, clutch input member 81 and the plurality of disks associated therewith, solenoid 65 will raise handset lifting member 66 to provide a connection of the telephone to the telephone line and audible alarm means 47 will be continuously energized. During an interval following the initial contact, conductive pin 19 is in engagement with dielectric timing disk 10A which is suitably positioned on dielectric sleeve 77 to provide an appropriate time delay or angular movement before pin 19 reaches groove 11 in dielectric timing disk 10A so as to allow for connection between telephone 100 and a central or branch exchange to be established. When shaft 76 has rotated a predetermined angular distance, which is related to the speed of rotation of shaft 76 and which under normal circumstances should be in the neighborhood of seven and one-half seconds, pin 19 will move to the left through groove 11 under the biasing force of lever 24 and establish electrical contact with conductive dialing disk 14A to complete a circuit for energizing solenoid 95. The energization of solenoid 95 drives clutch output member 85 with shaft 76 through clutch coupling member 83, and output member 85 will be rotated a predetermined angular distance dependent upon the angular distance from the contact of contact pin 19 with conductive dialing disk 14A and the point at which groove 15 is reached. The angular distance corresponds to a particular digit that forms a part of the telephone number being dialed. Upon reaching the groove, or notch 15, pin 19 on carriage 21 will again move to the left and engage the right face of dielectric timing disk 10B and the dial mechanism having been driven a predetermined angular distance will return to its normal or rest position and during such interval a number of pulses corresponding to the angular distance will be transmitted over the telephone lines to the central or branch exchange. After a predetermined interval dependent upon the angular relationship between groove 15 in conductive dialing disk 14A and groove 11 in dielectric timing disk 10B, pin 19 and carriage 21 will again move toward the left and establish contact with conductive dialing disk 14B. This will continue for the entire plurality of dielectric timing disks and conductive dialing disks until conductive pin 19 reaches dielectric timing disk 10I which, as noted above, does not include a notch in its periphery. As long as normally closed relay contact assembly 40 remains in the closed position, the telephone 100 will remain connected to the telephone line, motor 71 will be continuously energized and audible alarm means 47 will remain operative.

The apparatus may be easily reset by opening relay contact assembly 40, retracting contact pin 19 and moving carriage 21 to its initial starting position on bracket member 22. It is anticipated that this function may be performed with suitable means (not shown) to allow repetitive dialing of a telephone number and that such means may become apparent to one skilled in the art upon an understanding of the principles of my invention as disclosed and described in the drawings and specification set forth above.

Figure 11:
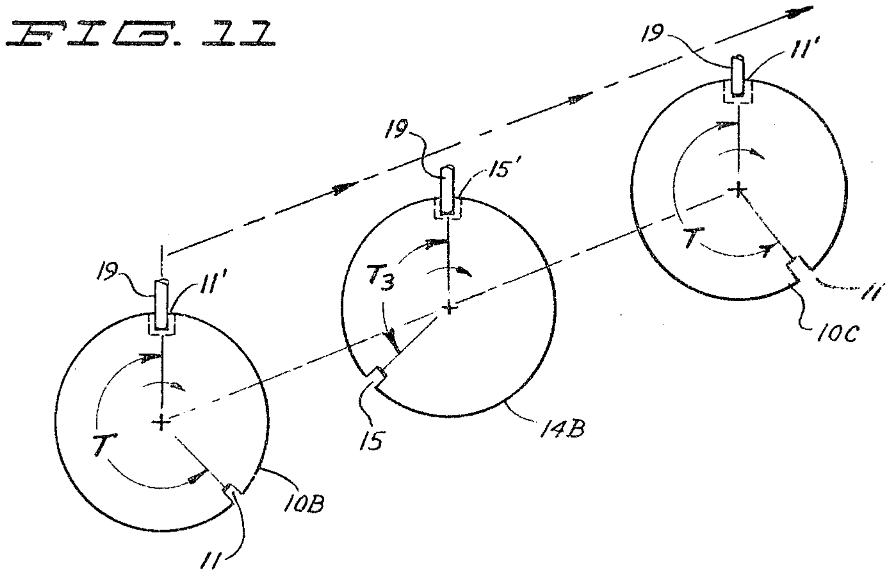
FIG. 11 is a sketch showing several of the details of FIGS. 3, 4, 7, 8 and 9 of the drawing to illustrate the principles of operation thereof.

In FIG. 11, the relative angular position between several of the dielectric timing disks 10 and conductive disks 14 has been shown for successive positions of contact pin 19. The orientation of the disks and contact pin 19 is reversed from the rest of the drawings. However, the operation may be easily understood from the following explanation. As described above, pin 19 is mounted on a slidable carriage that is spring biased in the direction shown by the elongated arrow at the top of FIG. 11. Pin 19 extends radially inwardly of the periphery of the respective disks and is thereby retained in a given position in engagement with the side of a disk at that position until the disk is rotated to an angular position whereat the notch 11 or 15 is coincident with the axis of movement of pin 19 on the slidable carriage. The notches in the disks are preset at predetermined angular relationships to provide an interval T intermediate each digit in a telephone code number and an interval $T_1 \ldots T_0$ for each digit in the number. The respective intervals are directly related to angular displacements and the speed of rotation of the shaft upon which the disks are mounted. The speed of the shaft may easily be determined by one skilled in the art as the intervals T, intermediate each digit in the code, will, of necessity, be great enough to allow the telephone dial mechanism to return to its start, or rest, position before another digit is dialed.

The illustration in FIG. 11 includes dielectric timing disks 10B and 10C and conductive dialing disk 14B. Pin 19 is shown in successive positions of engagement with each of the disks. The angular displacement, or time interval T, is indicated on dielectric timing disks as the angular distance between the position indicated as notch 11 and the succeeding position of notch 11, shown in phantom outline as notch 11'. In particular, pin 19 is shown as it first engages the side of timing disk 10B, disk 10B will then rotate the angular distance represented by the reference character T, at the end of the time interval, pin 19 will move to the next position to conductively engage the side of dialing disk 14B in the position shown. The angular relationship between positions 15 and 15' is indicated by the reference character $T_3$ which may correspond, for example, to the digit 3 in a telephone code number. This is also indicated on the graphic diagram in FIG. 12.

As explained above, pin 19 and dialing disk 14B cooperate to complete a circuit for energizing the solenoid to operatively engage clutch 80 to rotate dialing apparatus 130 for a predetermined time interval to cause a predetermined digit to be transmitted over the telephone lines. At the time notch 15 reaches the position indicated by reference numeral 15', pin 19 again advances to the next timing disk 10C. The relationship between notch 11 and pin 19 is such as to provide the time interval T between successive digits in the telephone code. It may thus be appreciated that the dielectric timing disks and conductive timing disks are initially oriented according to a predetermined angular relationship dependent on the telephone code number desired to provide suitable time intervals between successive operations of the telephone dial mechanism and to angularly position the dial mechanism in accordance with energization of the clutch operating solenoid for a predetermined time interval for each digit of the telephone code.

Figure 12:
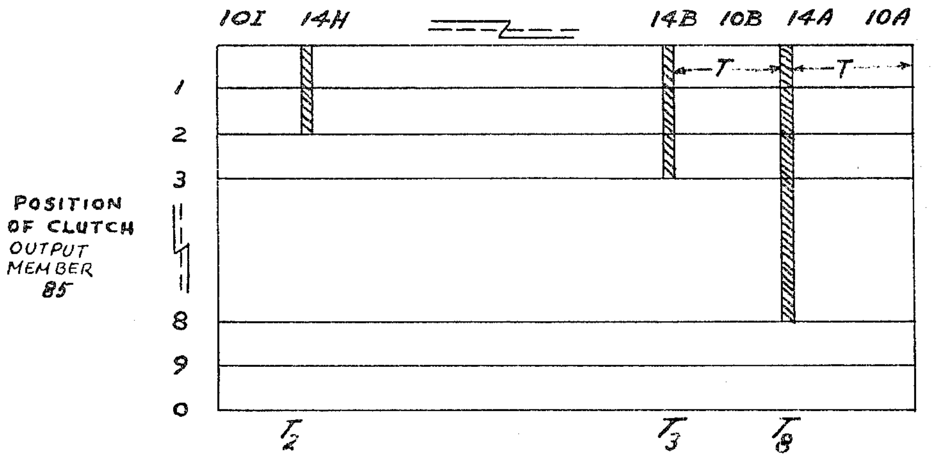
FIG. 12 is a graph illustrating the operation of the illustrated embodiment of my invention.

FIG. 12 shows the angular position of clutch output member for the first two and last digits of a telephone code and further illustrates the position of the output member during intervals T, intermediate the digits.

Figures 13, 14:
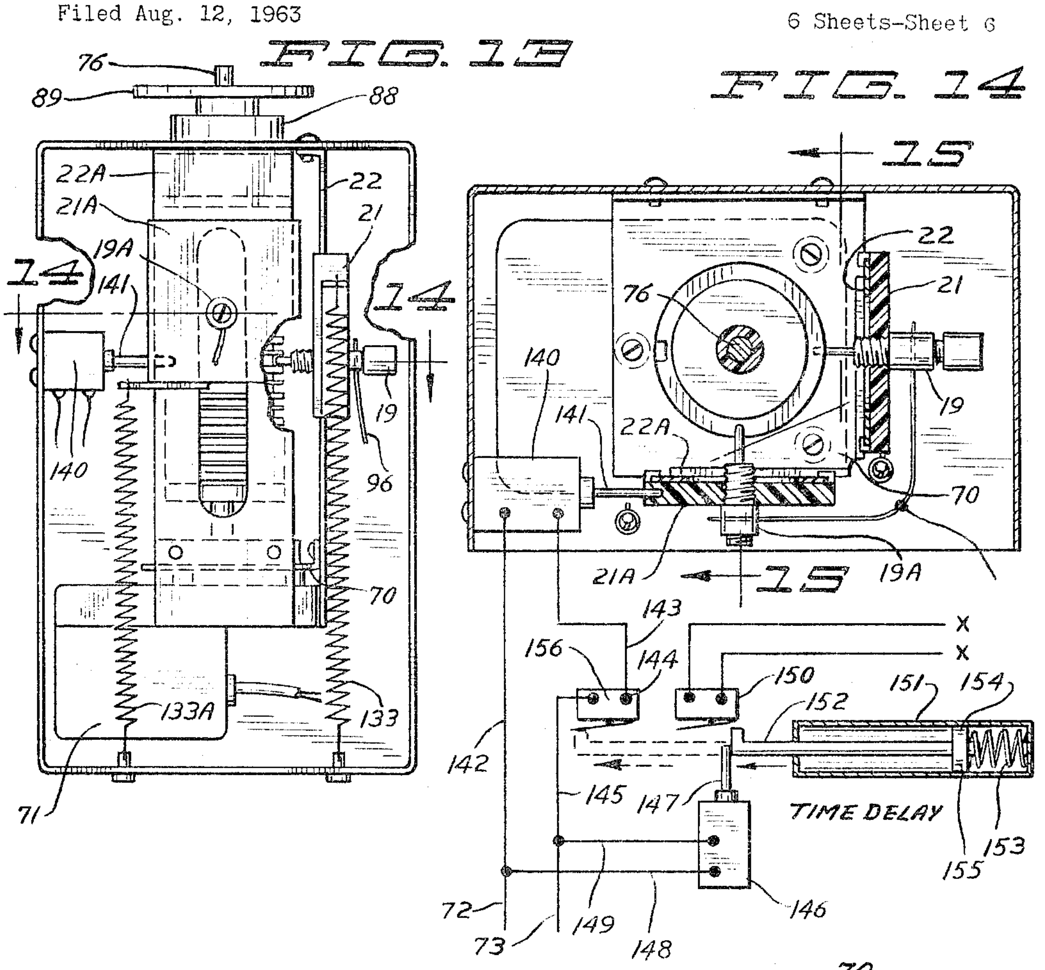
FIG. 13 is a bottom view of a further embodiment including apparatus for repeating the dialing of a telephone number.
FIG. 14 is a sectional view taken along section lines 14—14 in FIG. 13 and including a partial electrical schematic drawing.
Figure 15:
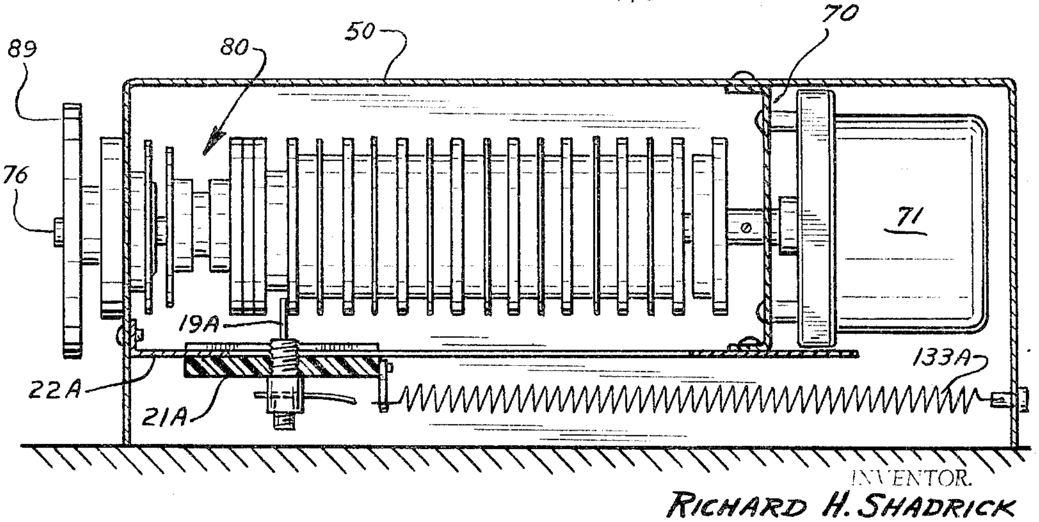
FIG. 15 is a sectional view taken along section lines 15—15 in FIG. 13.

FIGS. 13, 14 and 15 illustrate a modification of the embodiment described above and include apparatus for repeating the above described function. Certain portions, shown for example in FIG. 3, have been omitted to avoid repetition.

In FIGS. 13, 14 and 15 the carriage 21 and mounting 22 are utilized as in the embodiment of FIG. 3. The electrical connection to pin 19 has been modified and it may be noted that a spring biasing means 133 is directly connected to the carriage. It may be obvious that the direction of motion requires that the drum comprised of conductive and non-conductive disks will be reversed for proper operation of this embodiment and that carriage 22 will move toward the back of housing 50 as each successive digit of a telephone number is dialed. The operation will be the same as that described above.

In the present embodiment a second carriage 21A is slidably disposed on a second mounting bracket 22A (shown in phantom in FIG. 13) and a second spring biasing means 133A extends between carriage 21A and the rear of housing 50. Carriage 21A also includes a conductive pin extending radially inwardly as pin 19 and pins 19 and 19A are connected to conductor 96 (FIG. 10). Carriage 21A is retained in its starting position by virtue of engagement with the plunger 141 of a solenoid 140 that is suitably mounted on the side of housing 50.

Referring to FIG. 14 a hydraulic timing mechanism includes a cylinder 151 which contains a piston 154 and output shaft 152. An orifice 155 is provided to allow for the passage of a suitable fluid in cylinder 151 to provide a dashpot so that spring biasing means 153 may be operative to drive shaft 152 toward the left side of the drawing. Shaft 152 is retained in the position shown in the drawing by a solenoid 146 having a plunger 142 which is shown in engagement with shaft 152. Normally open switch means 156 and normally closed switch means 140, both including suitable operating levers, are suitably mounted for actuation by shaft 152 as it moves to the position indicated in phantom outline.

Solenoid 140 and normally open switch 156 are connected in series between conductors 72 and 73 (FIG. 10) through conductors 142, 143 and 145. Solenoid 146 is also connected to conductors 72 and 73 through conductors 148 and 149. Normally closed switch 150 is connected to terminals 134 and 135 (FIG. 10) and conductor 112 is removed intermediate these terminals so that switch 150 will then be in series with solenoid 65 (FIG. 10).

The operation of the embodiment of FIGS. 13–15 is initially the same as that above described in that motor 71 and solenoid 65 are energized at the time an undesired condition occurs. As may be noted in FIG. 14, the energization of motor 71 through conductors 72 and 73 also energizes solenoid 146 to release output shaft 152 which immediately starts to move toward the left at a speed determined by the size of orifice 155 and the force of spring 153.

The time required for shaft 152 to engage switch 150 should exceed the time necessary for the dialing of the telephone number as pin 19 on carriage 21 successively engages the dialing and timing disks as described above.

After the predetermined time interval, shaft 152 engages the operator for switch 150 and solenoid 65 is de-energized to allow receiver 102 to return to its normal position. After a suitable interval, shaft 152 moves out of engagement with switch 150 and solenoid 65 is again energized to reconnect the telephone to the line. Shaft 152 will then continue to travel until it engages switch 156 to energize solenoid 140 to retract plunger 141 and release carriage 21A. Carriage 21A may then operate in the same manner described in connection with carriage 21 to repeat the dialing of the predetermined number.

It may thus be seen that through the addition of suitable sliding contact carriages, suitable timing means and switching means, a telephone number may be dialed repetitively to provide a safety factor in the event the number dialed is busy, or for some other reason a connection is not made with a single dialing sequence.

A four minute interval between dialing is desirable.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a standard dial telephone, code signaling apparatus comprising:
(a) a shaft rotating at a constant speed;
(b) a plurality of conductive and non-conductive disks, each having at least one peripheral notch and alternately, adjustably mounted on said shaft;
(c) drive means rotatably mounted on one end of said shaft and in driving engagement with a telephone dial;
(d) clutch means non-rotatably mounted on said shaft and operable, in response to an electric current, to drivingly engage said driving means;
(e) contact means slidably mounted for axial movement with respect to said shaft and being adapted to engage a peripheral annular portion of each of said disks; and
(f) a source of electric current connected intermediate said clutch means, said contact means and each of said plurality of conductive disks.

2. In combination with a standard dial telephone, code signaling apparatus comprising:
(a) a rotatable shaft;
(b) means drivingly connected to said shaft for driving the same at a constant speed;
(c) a plurality of conductive and non-conductive disks, each having at least one peripheral notch and alternately positioned on said shaft for rotation therewith;
(d) drive means rotatably mounted on one end of said shaft and in driving engagement with a telephone dial;
(e) clutch means non-rotatably mounted on said shaft and operable, in response to an electric current, to drivingly engage said driving means;
(f) contact means slidably mounted for axial movement with respect to said shaft, said contact means being adapted to engage a peripheral annular portion of each of said disks; and
(g) a source of electric current connected intermediate said clutch means, said contact means and each of said plurality of conductive disks.

3. The apparatus of claim 2 in which the means drivingly connected to the shaft is operable in response to a predetermined condition.

4. In combination with a standard dial telephone, code signaling apparatus comprising:
(a) a housing adapted to support a dial telephone;
(b) a shaft rotatably journaled on said housing;

(c) a plurality of conductive and non-conductive disks, each having at least one peripheral notch and alternately disposed on said shaft for rotation therewith;

(d) drive means rotatably journaled on one end of said shaft and extending into unidirectional driving engagement with a telephone dial;

(e) clutch means non-rotatably mounted on said shaft and operable, in response to an electric current, to drivingly engage said driving means;

(f) motor means drivingly connected to said shaft and operable in response to the presence of a predetermined condition to rotate said shaft at a constant velocity;

(g) contact means slidably mounted for parallel axial movement with respect to said shaft, said contact means extending radially inwardly of said plurality of disks; and (h) a source of electric current connected intermediate said clutch means, said contact means and each of said plurality of conductive disks whereby said drive means is operative to rotate said telephone dial in accordance with progressive successive engagement of said contact means with said alternately disposed conductive disks.

5. The apparatus of claim 4 in which a dielectric sleeve is disposed intermediate the disks and said shaft and the conductive disks are interconnected by spring biased pin members disposed in apertures extending axially through the non-conductive disks.

6. The apparatus of claim 4 in which further means responsive to the predetermined condition is operable to establish connection of the dial telephone with a telephone system.

7. The apparatus of claim 6 in which the further means for establishing a telephone connection is a solenoid adapted to lift the receiver on the telephone.

8. The apparatus of claim 6 in which a timing means is operative at a predetermined time after the occurrence of the predetermined condition to temporarily disconnect the telephone from the system and after re-establishing a connection to repeat the operation of the telephone dial.

9. In combination with a standard dial telephone, code signaling apparatus comprising:

(a) a shaft rotating at a constant speed;

(b) a plurality of conductive and non-conductive disks, each having at least one peripheral notch adjustably and alternately disposed on said shaft for rotation therewith, the peripheral notches in said disks being positioned in predetermined angular relationship;

(c) drive means rotatably mounted on one end of said shaft and in unidirectional driving engagement with a telephone dial;

(d) clutch means non-rotatably mounted on said shaft and operable, in response to an electric current, to drivingly engage said driving means;

(e) contact means slidably mounted for axial movement with respect to said shaft, said contact means extending radially inwardly of the periphery of said disks whereby axial movement of said contact means is determined by the peripheral notches in said disks; and (f) a source of electric current connected intermediate said clutch means, said contact means and each of said plurality of conductive disks.

10. Condition responsive apparatus for use in combination with a dial telephone, comprising in combination:

(a) a housing adapted to receive a dial telephone;

(b) a shaft rotatably journaled within said housing;

(c) driving means connected to said shaft;

(d) output means rotatably journaled on said shaft;

(e) means drivingly connecting said output means to the dialing mechanism on said telephone;

(f) a plurality of conductive and non-conductive disks alternately disposed on said shaft, each of said disks having at least one radially disposed notch;

(g) means interconnecting said conductive disks;

(h) clutch means rotatable with said shaft and said plurality of disks and operable to drivingly engage said output means;

(i) current responsive means for actuating said clutch means to engage said output means;

(j) contact means slidably disposed parallel to the axis of said shaft, said contact means extending radially inwardly of the peripheries of said disks for engagement with an annular peripheral portion thereon; and (k) means responsive to a predetermined condition for energizing said driving means and for connecting a source of electrical current in current conductive relationship with said contact pin, said conductive disks and the means for actuating the clutch means.

11. Switching apparatus for use in telephone dialing apparatus of the class above described, comprising in combination:

(a) a shaft to be rotated at a predetermined substantially constant speed;

(b) a plurality of conductive and non-conductive disks, each of said disks having a peripheral notch and having substantially the same diameter, said disks being alternately disposed on said shaft;

(c) contact means extending radially inwardly of the peripheries of said disks and being movable axially of said shaft to successively engage said disks; and (d) circuit means, including a pair of terminals for connection to an output device, connecting a source of energy intermediate said conductive disks and said contact means.

12. The apparatus of claim 11 in which the disks are adjustably mounted on said shaft.

13. The apparatus of claim 12 in which a conductive spring biased pin is disposed in an aperture extending axially through each of the non-conductive disks.

14. The apparatus of claim 4 in which a second contact means connected to the source of electric current is slidably mounted to extend radially inwardly of the disks and timing means operative in response to the predetermined condition to release the second contact means a predetermined time after the occurrence of said predetermined condition.

No references cited.

KATHLEEN H. CLAFFY, *Primary Examiner.*

J. W. JOHNSON, *Assistant Examiner.*